US009298733B1

(12) United States Patent
Faibish et al.

(10) Patent No.: US 9,298,733 B1
(45) Date of Patent: Mar. 29, 2016

(54) STORING FILES IN A PARALLEL COMPUTING SYSTEM BASED ON USER OR APPLICATION SPECIFICATION

(75) Inventors: Sorin Faibish, Newton, MA (US); John M. Bent, Los Alamos, NM (US); Jeffrey M. Nick, Milford, MA (US); Gary Grider, Los Alamos, NM (US); Aaron Torres, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 13/536,289

(22) Filed: Jun. 28, 2012

(51) Int. Cl.
*G06F 17/30* (2006.01)

(52) U.S. Cl.
CPC .................................... *G06F 17/302* (2013.01)

(58) Field of Classification Search
None
See application file for complete search history.

(56) References Cited

U.S. PATENT DOCUMENTS

| 7,394,408 B2* | 7/2008 | Suzuki et al. ................... 341/50 |
| 7,567,188 B1* | 7/2009 | Anglin et al. ................... 341/63 |
| 7,593,966 B2* | 9/2009 | Therrien et al. | |
| 8,352,429 B1* | 1/2013 | Mamidi et al. ................ 707/640 |
| 2004/0098373 A1* | 5/2004 | Bayliss et al. ..................... 707/3 |
| 2006/0136928 A1* | 6/2006 | Crawford et al. ............. 718/105 |
| 2010/0241616 A1* | 9/2010 | Murphy et al. ................ 707/661 |
| 2011/0302226 A1* | 12/2011 | Abadi et al. ................... 707/825 |
| 2012/0158669 A1 | 6/2012 | Morsi et al. | |

OTHER PUBLICATIONS

Bent et al., PLFS: A Checkpoint Filesystem for Parallel Applications, International Conference for High Performance Computing, Networking, Storage and Analysis 2009 (SC09), Nov. 2009.
EMC FAST Cache, http://www.emc.com/collateral/software/white-papers/h8046-clariion-celerra-unified-fast-cache-wp.pdf, Oct. 2011.

* cited by examiner

*Primary Examiner* — Anh Tai Tran
(74) *Attorney, Agent, or Firm* — Ryan, Mason & Lewis, LLP

(57) ABSTRACT

Techniques are provided for storing files in a parallel computing system based on a user-specification. A plurality of files generated by a distributed application in a parallel computing system are stored by obtaining a specification from the distributed application indicating how the plurality of files should be stored; and storing one or more of the plurality of files in one or more storage nodes of a multi-tier storage system based on the specification. The plurality of files comprise a plurality of complete files and/or a plurality of sub-files. The specification can optionally be processed by a daemon executing on one or more nodes in a multi-tier storage system. The specification indicates how the plurality of files should be stored, for example, identifying one or more storage nodes where the plurality of files should be stored.

24 Claims, 4 Drawing Sheets

FIG. 2

```
// LIST is a list of IP addresses
// the plfsrc maps IP addresses to backends
// "file" could be an entire file or it could be a range of blocks from a file int plfs_protect("file", LIST, LOCK=TRUE/FALSE) {

// first go through and find all existing replicas by reading the metadata
    Index *index = Container::constructIndex("file") // this reads metadata
    set<targets> = LIST
    foreach replica already in index
        targets -= replica // now initiate a replicate command for each remaining requested replica
    // the syncer is a separate data replication tool
    foreach target in targets
        if LOCK==TRUE Container::lockFile("file",target) // this augments metadata to lock
        syncer.replicate("file", target)
}
```

FIG. 3

```
// LIST is just a list of IP addresses
// the plfsrc maps IP addresses to backends
// "file" could be an entire file or it could be a range of blocks from a file
int plfs_trim("file", LIST) {
    // first go through and find all existing replicas by reading the metadata
    Index *index = Container::constructIndex("file") // this reads metadata set<victims> = LIST
    set<replicas> = index.replicas()

// check whether we are being asked to remove all replicas. This is error.
    // To remove all replicas, a user should call plfs_unlink("file")
    if victims == replicas return "User error. Use plfs_unlink instead."

// if user correctly called this function, now remove each requested replica
    foreach victim in victims
        Container::removeReplica(replica) // deletes replica and updates metadata
}
```

```
// LIST is just a list of IP addresses
// the plfsrc maps IP addresses to backends
// "file" could be an entire file or it could be a range of blocks from a file LIST plfs_query("file") {

// first go through and find all existing replicas by reading the metadata
    Index *index = Container::constructIndex("file") // this reads metadata set<replicas> = index.replicas()
    return replicas
}
```

*FIG. 5*

```
struct {
  float compressability;
  float longevity;
  float reusability;
  LIST<shards> deduplicate_siblings;
} plfs_info;
```

STORING FILES IN A PARALLEL COMPUTING SYSTEM BASED ON USER OR APPLICATION SPECIFICATION

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The present invention relates to parallel storage in high performance computing environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. One particular parallel computing application models the flow of electrons within a cube of virtual space by dividing the cube into smaller sub-cubes and then assigning each sub-cube to a corresponding process executing on a compute node.

Storage tiering techniques are increasingly used in parallel computing environments to more efficiently store the vast amounts of information. For example, the Symmetrix® system from EMC Corporation is an enterprise storage array that optionally includes Fully Automated Storage Tiering (FAST). Storage tiering techniques typically combine Non-Volatile Random Access Memory (NVRAM), also referred to as flash memory, with more traditional hard disk drives (HDDs). Flash memory is used to satisfy the bandwidth requirements of a given system while the hard disk drives are used to satisfy the capacity requirements.

Storage tiering systems typically use automated tiering techniques that control the tiering of data (i.e., on what tier(s) the data is stored). The automated techniques are typically based on heuristic methods that store the data blocks on different tiers of storage based on an understanding of the characteristics of the data. While existing tiering techniques demonstrate acceptable performance, there are a number of cases where the application exhibits different behavior than that observed by the auto-tiering software. Thus, a significant percentage of applications observe poor performance due to an inappropriate data placement policy.

A need therefore exists for improved techniques for determining how to store data in a hierarchical storage tiering system. Moreover, there is a need for data protection and snapshots that are based on a programmatic approach controlled, for example, by an information technology (IT) administrator.

SUMMARY

Embodiments of the present invention provide improved techniques for storing files in a parallel computing system based on a user or application specification. In one embodiment, a method is provided for storing a plurality of files generated by a distributed application in a parallel computing system, wherein the plurality of files comprise one or more of a plurality of complete files and a plurality of sub-files. The method comprises the steps of obtaining a specification from the distributed application indicating how the plurality of files should be stored; and storing one or more of the plurality of files in one or more storage nodes of a multi-tier storage system based on the specification. The method can optionally be implemented by a daemon executing on one or more nodes in the multi-tier storage system.

According to one aspect of the invention, the specification identifies one or more storage nodes where the plurality of files should be stored. For example, the specification can indicate a replica quantity for the plurality of files. In addition, the specification can identify one or more tiers in the multi-tier storage system for storing one or more of the files.

According to another aspect of the invention, the specification indicates how the plurality of files should be stored. For example, the specification can indicate whether the files are compressible. In addition, the specification can optionally indicate whether the files should be compressed prior to storage in an identified tier of the multi-tier storage system. The specification can also indicate whether the files will be re-read. The specification can also optionally identify one or more additional files that are similar to the plurality of files.

Among other benefits, files can also be deleted based on the specification. For example, the deletion of files can be based on whether the user has locked the files. Another aspect of the invention provides a list of the storage devices where a given file is stored.

Advantageously, illustrative embodiments of the invention provide techniques for storing files in a parallel computing system based on a user-specification. The information contained in the specification permit the files to be stored with reduced data processing and transfer bandwidth costs, and preserves valuable disk space.

These and other features and advantages of the present invention will become more readily apparent from the accompanying drawings and the following detailed description.

BRIEF DESCRIPTION OF THE DRAWINGS

FIG. 2 illustrates exemplary pseudocode for processing a plfs_protect function that generates one or more replicas for each indicated file in accordance with aspects of the present invention;

FIG. 3 illustrates exemplary pseudocode for processing a plfs_trim function that removes copies of files for each indicated file;

FIG. 4 illustrates exemplary pseudocode for processing a plfs_query function that returns a list specifying the storage nodes where an indicated file currently resides; and FIG. 5 illustrates exemplary pseudocode for processing a plfs_info function that allows the application to specify how a file should be stored.

DETAILED DESCRIPTION

Figure 1:
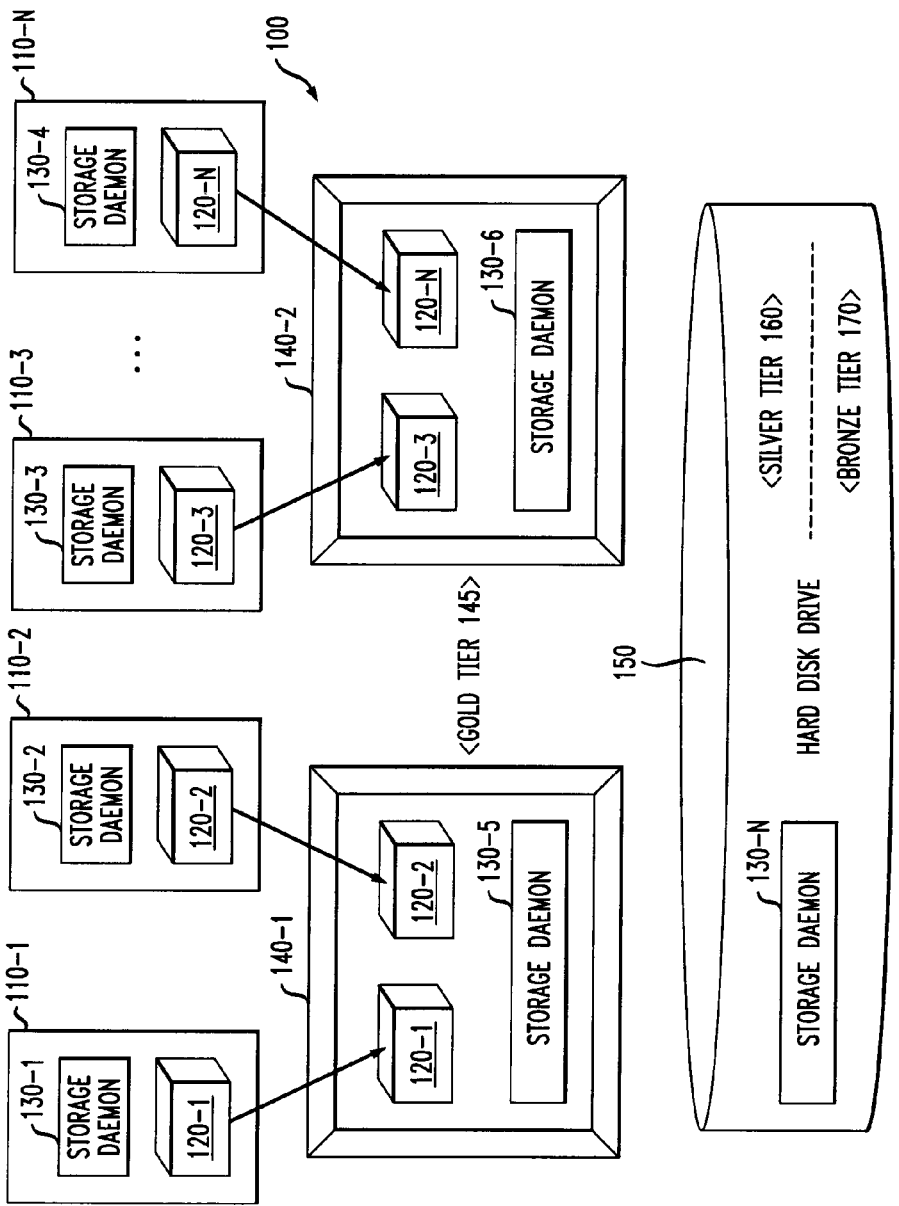
FIG. 1 illustrates an exemplary hierarchical storage tiering system that incorporates aspects of the present invention.

The present invention provides improved techniques for specifying how and where to store data in a hierarchical storage tiering system. Embodiments of the present invention will be described herein with reference to exemplary computing systems, data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "files" shall include complete files and portions of files, such as sub-files or shards.

According to one aspect of the invention, an application or user can specify how to store files in a hierarchical storage tiering system, such as where and for how long to store the file in a hierarchical storage tiering system. In this manner, the application or user has first-hand information about the characteristics of the data that is being stored, and can specify how and where to store the data.

Storage tiering techniques are increasingly used in parallel computing environments to more efficiently store the vast amounts of information. For example, the Symmetrix® system from EMC Corporation is an enterprise storage array that optionally includes Fully Automated Storage Tiering (FAST). Storage tiering techniques typically combine Non-Volatile Random Access Memory (NVRAM), also referred to as flash memory, with more traditional hard disk drives (HDDs). Flash memory is used to satisfy the bandwidth requirements of a given system while the hard disk drives are used to satisfy the capacity requirements.

FIG. 1 illustrates an exemplary hierarchical storage tiering system 100 that incorporates aspects of the present invention. As shown in FIG. 1, the hierarchical storage tiering system 100 comprises a plurality of compute nodes 110-1 through 110-N (collectively, compute nodes 110) each having a portion 120-1 through 120-N of a distributed data structure or other information to store. For example, four compute nodes 110-1 through 110-4 can each process climate data for a different quadrant of a country, such as northeast, northwest, southeast and southwest quadrants. The compute nodes 110 optionally store the portions 120 of the distributed data structure in one or more nodes of the exemplary hierarchical storage tiering system 100, such as two exemplary flash based storage nodes 140-1, 140-2 (e.g., burst buffer nodes). The tier containing the burst buffer nodes 140-1, 140-2 may be referred to, for example, as a Gold Tier 145.

In addition, the exemplary hierarchical storage tiering system 100 comprises one or more hard disk drives 150. The tier containing the hard disk drives 150 may be further divided, for example, into a Silver Tier 160 and a Bronze Tier 170. In one variation, the Bronze Tier 170 may be implemented, for example, using an optional tier of slower tape memory (not shown in FIG. 1). The tiers 145, 160, 170 may optionally be described by standard gold, silver, and bronze designations and may be differentiated by different bandwidths, different latencies, different reliabilities, and different capacities, in a known manner.

According to one aspect of the present invention, one or more nodes in the exemplary hierarchical storage tiering system 100, such as the compute nodes 110, the flash based storage nodes 140-1, 140-2 and the hard disk drives 150, include one or more associated storage daemons 130-1 through 130-N (collectively referred to as storage daemons 130) that process the data blocks 120 as they are written into the corresponding node 110, 140, 150. The storage daemons 130 may be executed, for example, by a processor, a microprocessor, a microcontroller, an application-specific integrated circuit (ASIC), a field-programmable gate array (FPGA) or other type of processing circuitry, as well as portions or combinations of such circuitry elements.

According to a further aspect of the invention, the storage daemons 130 control selective storage on one or more of the flash based storage nodes 140-1, 140-2 and/or a hard disk drive (HDD) 150 (e.g., a parallel file system) based on an application or user specification of how to store files in the exemplary hierarchical storage tiering system 100. In this manner, when the data blocks 120 are written to the exemplary flash based storage nodes 140 or hard disk drive(s) 150, the data is processed by a storage daemon 130 to determine how the data should be stored (such as where it should be stored and when it should be deleted). Exemplary functions for administering the selective storage aspect of the present invention are discussed below in the section entitled "Selective Storage Functions," in conjunction with FIGS. 2-5. Note that the burst buffers 140 might be an explicit delineated storage tier 145, as shown in FIG. 1, or they might be a fast buffer within another storage tier (for example, it could be memory on the compute node 140 or memory within the storage array 150).

PLFS can make the placement decision automatically or it can be explicitly controlled by the application and administered by the storage daemons 130. For a more detailed discussion of automated storage tiering, see, for example, U.S. patent application Ser. No. 13/536,331, entitled "Storing Files in a Parallel Computing System Using List-Based Index to Indicate Replica Files," (now U.S. Pat. No. 9,087,075), filed contemporaneously herewith and incorporated by reference herein.

In a conventional PLFS implementation, data is first written to the flash based storage nodes 140 (also referred to as Solid State Data (SSD) nodes), and is then copied to the parallel file system 150. The data is removed from the flash based storage nodes 140 when capacity is needed. Aspects of the present invention extend the notion of a fast tier to optionally include memory buffers and to include a deeper tiering which extends into the storage array itself. The full stack of tiers may be any subset, or the complete set, of: memory on the compute node 110, memory in a flash based storage node 140, solid state devices in a flash based storage node 140, or memory, SSD, fast disk, slow disk in a storage array, and a tape system.

The present invention recognizes that such storage tiering provides a new opportunity for a daemon 130 to execute, for example, in one or more of the compute nodes 110, the flash based storage nodes 140-1, 140-2 and the hard disk drives 150 to selectively store and remove the data in response to information from the user. Generally, the application will know the characteristics of the data and future access patterns better than the auto-tiering system.

While an application might not precisely know which tier 145, 160, 170 to store a given file on, the application will know the usecase for the data. For example, the application will know that data being stored is a checkpoint and therefore unlikely to be re-read (especially after some threshold of time, such as three hours) or that data being stored is for immediate subsequent analysis. In this case, the PLFS and FAST, which understand the storage tiering, can make informed decisions using the usecase information provided in the specification by the application (see FIG. 5 and corresponding discussion) to control how and where the data is stored.

In addition to information to help placement within the storage tiering, application information in accordance with the present invention can help PLFS determine appropriate data services for the stored data. Such information can help influence replication levels, RAID type, compression, and deduplication. For example, the application might specify that data will be short-lived so PLFS might decide not to replicate it. The application could specify whether other files already in the storage system are similar to the data being stored in which case PLFS can optimize deduplication identification of identical blocks. Alternatively, the application can specify that the file represents a sparse data structure which PLFS would use to decide to compress the data since sparse data is known to compress efficiently; conversely, if the application indicates that the data comprises high-precision scientific data, then PLFS will not compress the file since this type of data will not compress efficiently.

In one exemplary embodiment, the middleware file system that processes the data blocks as they are written into the flash based storage nodes is implemented using the Fully Automated Storage Tiering (FAST) system of EMC Corporation and the Parallel Log-Structured File System (PLFS), as modified herein to provide the features and functions of the present invention. See, for example, "EMC FAST Cache, A Detailed Review" (EMC Corporation White Paper, October 2011), or John Bent et al., "PLFS: A Checkpoint Filesystem for Parallel Applications," Int'l Conf. for High Performance Computing, Networking, Storage and Analysis 2009 (SC09) (November 2009), each incorporated by reference herein. Generally, conventional PLFS improves the efficiency of checkpoint techniques for parallel applications by inserting an interposition layer into the existing storage stack to rearrange the problematic access pattern associated with checkpoints.

Among other benefits, the specification of how and where a given file is stored can be scheduled according to a policy (e.g., where a visualization analysis routine is requested to retain uncompressed data for a certain time).

Selective Storage Functions

According to an aspect of the present invention, explicit storage control is provided with the following exemplary commands.

plfs_protect Command and Function

FIG. 2 illustrates exemplary pseudocode 200 for processing a plfs_protect function. The pseudocode 200 is executed by one or more storage daemons 130. As shown in FIG. 2, the plfs_protect function has the following arguments:

("file", LIST, TRUE/FALSE), where the "file" argument can be a complete file, a sub-file, a range of bytes or an object; the LIST argument is a list of possible storage locations such as flash based storage nodes 140 or the parallel file system 150. The plfs_protect command ensures that the file is replicated across the devices specified in the list. If the third argument is TRUE, then the file will be pinned (i.e., locked) to those devices. If the third argument is FALSE, then the file is eligible for removal when space is required.

The plfs_protect function initially finds all existing replicas by reading the file metadata and then initiates a replicate command for each remaining requested replica.

plfs_trim Command and Function

FIG. 3 illustrates exemplary pseudocode 300 for processing a plfs_trim function. The pseudocode 300 is executed by one or more storage daemons 130. As shown in FIG. 3, the plfs_trim function has the following arguments:

("file", LIST), where the "file" argument can again be a complete file, a sub-file, a range of bytes or an object; and the LIST argument is again a list of possible storage locations. The plfs_trim function removes extraneous copies according to the LIST in the manner described above.

plfs_query Command and Function

FIG. 4 illustrates exemplary pseudocode 400 for processing a plfs_query function. The pseudocode 400 is executed by one or more storage daemons 130. As shown in FIG. 4, the plfs_query function has a "file" argument. The exemplary plfs_query function returns a list specifying the storage nodes where the file currently resides.

plfs_info Command and Function

FIG. 5 illustrates exemplary pseudocode 500 for processing a plfs_info function. The pseudocode 500 is executed by one or more storage daemons 130. As shown in FIG. 5, the plfs_info function allows the application to specify how a file should be stored.

An application can create the structure shown in FIG. 5, and then pass the structure to a plfs_open call, a plfs_write call, a plfs_read call, or a plfs_info call. If information is unknown, the application can specify PLFS_INFO_UNDEFINED for each value. The compressability field gives information about whether a region of the file is compressible. For example, dense scientific data typically does not compress well but sparse matrices do. PLFS can use compression selectively by tier as well. It is noted that some data may compress well but slowly in which case PLFS will not compress the data before writing the data to the fast tier 140 but will compress the data before writing the data to the slow tier 160, 170.

The longevity field can also inform placement decisions and replica quantity. For example, short lived data need never leave the fast tier 140 and will not need replicas for recoverability.

The reusability field will indicate whether the data will be re-read. If the data will be re-read, a copy should be maintained in the fast tier 140.

The deduplicate_siblings field indicates which other existing data may be similar to this data. The deduplicate_siblings information can speed the identification of deduplicated blocks Some of these decisions associated with the plfs_info function are similar to the explicit control in the plfs_protect command. The plfs_protect function, however, applies when applications want to specify which tiers to use. The plfs_info function applies when an application knows the use case but relies on the storage system to make the intelligent decisions. In this manner, the storage decisions are informed with explicit knowledge from the application.

Returning to FIG. 1, the application can optionally use the plfs_protect command if the application wants to replicate data block 120-1, for example, on flash based storage node 140-2, and/or if the application wants to replicate data block 120-4, for example, on flash based storage node 140-1.

Likewise, the application can optionally use the plfs_protect command with a LOCK (i.e., third argument set to TRUE) if the application wants to replicate and retain data block 120-1, for example, on flash based storage node 140-2 (i.e., ensure that the data block 120-1 is not removed from flash based storage node 140-2), and/or if the application wants to replicate and retain data block 120-4, for example, on flash based storage node 140-1.

An application can use the plfs_trim command to inform the PLFS that one or more data blocks 120 can be removed from the flash based storage nodes 140 when needed. The removal can be advisory or mandatory.

Example Use Case

Consider an application running on the compute nodes 110 that wants to checkpoint frequently. The application will write checkpoints into the flash based storage nodes 140 and then the checkpoints will be automatically migrated to the parallel file system 150. Assume a scenario in which only three checkpoints fit into the flash based storage nodes 140. Thus, by default, the flash based storage nodes 140 will save the most recent three checkpoints.

Some applications, however, might prefer that some older checkpoints are retained over some newer ones. For example, perhaps every tenth checkpoint requires comparison against the previous tenth checkpoint. In this case, the application will do normal write operations to most checkpoints but will then issue a plfs_protect( ) command every tenth checkpoint with a LOCK (i.e., third argument set to TRUE) until the checkpoint can be compared to the next tenth checkpoint at which point the checkpoint can be trimmed with the plfs_trim( ) command. A common workload like this is called "time-series analysis."

Another scenario would be an application that wants to add additional reliability into the flash based storage nodes 140. The application can use the plfs_protect( ) command to replicate the data across multiple flash based storage nodes 140. When the data is not replicated across multiple flash based storage nodes 140, when a flash based storage node 140 fails, any data lost may be recovered from the parallel file system 150 if it has already migrated. If the application explicitly replicates the data across multiple flash based storage nodes 140, however, then when a flash based storage node 140 fails, the data from the failed node 140 can be recovered from a neighboring flash based storage node 140.

The conventional exemplary PLFS index structure maintains a single pointer for each block of data. To add replica support in accordance with the present invention, the index structure can be extended to maintain a list of pointers for each block of data.

Because PLFS files can be shared across many locations, data movement required to implement these functions can be performed more efficiently when there are multiple nodes cooperating on the data movement operations. Therefore, when this is run on a parallel system with a parallel language, such as MPI, PLFS can provide MPI versions of these functions which will allow it to exploit parallelism for more efficient data manipulation.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for storing at least one sub-file created by a distributed source application and sent by said distributed source application to a parallel computing system for storage, wherein said at least one sub-file comprises a portion of a larger file, said method comprising the steps of:
    obtaining a specification from said distributed source application indicating how said at least one sub-file should be stored in said parallel computing system;
    processing said specification prior to storage of said at least one sub-file to determine a placement for storing said at least one sub-file within said parallel computing system; and
    storing said at least one sub-file in one or more storage nodes of a multi-tier storage system within said parallel computing system based on said placement determined from said specification.

2. The method of claim 1, wherein said specification identifies one or more of said storage nodes where said at least one sub-file should be stored.

3. The method of claim 2, wherein said specification indicates a replica quantity for said at least one sub-file.

4. The method of claim 2, wherein said specification identifies one or more tiers in said multi-tier storage system for storing said at least one sub-file.

5. The method of claim 1, wherein said specification indicates whether said at least one sub-file is compressible.

6. The method of claim 1, wherein said specification indicates whether said at least one sub-file will be re-read.

7. The method of claim 1, wherein said specification identifies one or more additional files that are similar to said at least one sub-file.

8. The method of claim 1, wherein said method is implemented by a daemon executing on one or more nodes in a multi-tier storage system.

9. The method of claim 1, further comprising the step of deleting said at least one sub-file based on said specification.

10. The method of claim 1, further comprising the step of returning a list of said storage nodes where said at least one sub-file is stored.

11. The method of claim 1, wherein said specification implements one or more of a policy and a schedule.

12. A computer program product comprising a tangible processor-readable recordable storage memory having encoded therein executable code of one or more software programs, wherein the one or more software programs when executed by a processor implement the steps of the method of claim 1.

13. An apparatus for storing at least one sub-file created by a distributed source application and sent by said distributed source application to a parallel computing system for storage, wherein said at least one sub-file comprises a portion of a larger file, comprising:
    a memory; and
    at least one hardware device operatively coupled to the memory and configured to:
    obtain a specification from said distributed source application indicating how said at least one sub-file should be stored in said parallel computing system;
    process said specification prior to storage of said at least one sub-file to determine a placement for storing said at least one sub-file within said parallel computing system; and store said at least one sub-file in one or more storage nodes of a multi-tier storage system within said parallel computing system based on said placement determined from said specification.

14. The apparatus of claim 13, wherein said specification comprises one or more of (i) an identification of one or more of said storage nodes where said at least one sub-file should be stored; (ii) a replica quantity for said at least one sub-file; and (iii) an identification of one or more tiers in said multi-tier storage system for storing said at least one sub-file.

15. The apparatus of claim 13, wherein said specification comprises one or more of: (i) an indication of whether said at least one sub-file is compressible; (ii) an indication of whether said at least one sub-file will be re-read; and (iii) an indication of one or more additional files that are similar to said at least one sub-file.

16. The apparatus of claim 13, wherein said at least one hardware device comprises a daemon executing on one or more nodes in a multi-tier storage system.

17. The apparatus of claim 13, wherein said at least one hardware device is further configured to delete said at least one sub-file based on said specification.

18. The apparatus of claim 13, wherein said at least one hardware device is further configured to return a list of said storage nodes where said at least one sub-file is stored.

19. A data storage system for storing at least one sub-file created by a distributed source application and sent by said distributed source application to a parallel computing system for storage, wherein said at least one sub-file comprises a portion of a larger file, comprising:
a processing device configured to obtain a specification from said distributed source application indicating how said at least one sub-file should be stored in said parallel computing system; and to process said specification prior to storage of said at least one sub-file to determine a placement for storing said at least one sub-file within said parallel computing system; and store said at least one sub-file in one or more storage nodes of a multi-tier storage system within said parallel computing system based on said placement determined from said specification.

20. The data storage system of claim 19, wherein said specification comprises one or more of (i) an identification of one or more of said storage nodes where said at least one sub-file should be stored; (ii) a replica quantity for said at least one sub-file; and (iii) an identification of one or more tiers in said multi-tier storage system for storing said at least one sub-file.

21. The data storage system of claim 19, wherein said specification comprises one or more of: (i) an indication of whether said at least one sub-file is compressible; (ii) an indication of whether said at least one sub-file will be re-read; and (iii) an indication of one or more additional files that are similar to said at least one sub-file plurality of files.

22. The data storage system of claim 19, wherein said processing unit comprises a daemon executing on one or more nodes in a multi-tier storage system.

23. The data storage system of claim 19, wherein said processing unit is further configured to delete said at least one sub-file based on said specification.

24. The data storage system of claim 19, wherein said processing unit is further configured to return a list of said storage nodes where said at least one sub-file is stored.

* * * * *